Figure 1:
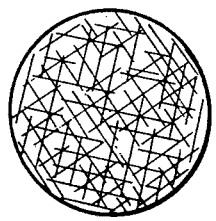

Feb. 16, 1954

H. G. ANDRE 2,669,594

ELECTRICAL ACCUMULATOR

Filed March 28, 1952

INVENTOR:
HENRI G. ANDRÉ
BY
Karl F. Ross
AGENT

Patented Feb. 16, 1954

2,669,594

UNITED STATES PATENT OFFICE 2,669,594

ELECTRICAL ACCUMULATOR

Henri Georges André, Montmorency, France, assignor to Yardney International Corp., New York, N. Y., a corporation of New York Application March 28, 1952, Serial No. 279,200

Claims priority, application France March 30, 1951

2 Claims. (Cl. 136—6)

This invention relates to electro-chemical generators of energy, especially to electrical accumulators or storage batteries. It is particularly applicable to electric accumulators of the type containing at least one electro-chemically active substance in divided form.

The use of substances in a highly divided state as the substances involved in the electro-chemical reactions responsible for the operation of an electrical accumulator imparts to the latter certain specific characteristics arising in particular out of the much greater rapidity at which the said reactions then progress. Such improved characteristics are especially marked in the case of silver accumulators, and it is to this particular type that the invention is preferably applied, silver-zinc accumulators at present representing the most desirable embodiments thereof from the commercial viewpoint.

It has been found that, while such accumulators possess considerably improved qualities over conventional accumulators such as lead or nickel accumulators, this superiority applied in all respects, but not so much to the useful life's duration.

Thus, whereas a silver-zinc accumulator may be five times lighter in weight than a lead or nickel accumulator of equivalent capacity, and may possess a discharge rate four times as high as that of the latter, it has not been possible so far to produce silver-zinc accumulators having a number of useful operating cycles much more than two and a half times that of conventional accumulators.

Experience has shown that after a certain number of cycles, usually of the approximate order of one hundred, the electrical capacity of the accumulator gradually drops, at such a rate that at the end of two or three hundred cycles it is only one half its initial value, so that the accumulator is no longer capable of fulfilling the functions for which it was designed.

It has already previously been put forward that this degeneration of the accumulator was assignable to the negative substance therein, namely the zinc, for samples of this substance have shown that, after a certain number of operating cycles, the zinc content, or more precisely the content of zinc compounds therein, is no longer uniform throughout the container, said content increasing from the top towards the bottom of the container.

This peculiarity may probably be connected both with the inherent nature of the negative substance and with the peculiar manner of operation of the accumulator. Indeed, whereas during operation the so-called positive substance, e. g. silver, tends to harden, thereby imparting to the positive electrodes increased cohesion and permanence of shape conducive to the retainment of the electro-chemical characteristics of the apparatus, the negative substance on the other hand remains in a flowing or loose state due to its divided condition, which on the other hand is favorable as far as the progress of the reactions is concerned. The negative particles do not agglomerate, but remain physically discrete from one another, showing no trend towards a solid condition.

In another connection, the complexity of the electro-chemical reactions leads to the assumption that silver-zinc accumulators, though intended to operate according to the so-called "insoluble negative electrode" process, actually do operate, at least in part, according to the soluble-negative-electrode process. In other words, whereas it is true that the major part of the output energy results from oxidation and reduction reactions of the active substances, it is now believed that even in an accumulator, in which the electrolyte is initially saturated with zinc, there occurs a certain amount of dissolution of the zinc and hence a subsequent precipitation thereof, at least during certain phases of the operation. Now, the electrolyte, an aqueous solution of potassium zincate, increases gradually in concentration from the upper level of the electrodes downwards, so that, during the charging step, if a zinc precipitation occurs, it is much more abundant towards the bottom than at the top.

All these various above-described phenomena, which can ultimately be traced to the effect of gravity, result in a gradual alteration of the content of the container. The originally "homogeneous" structure of the accumulator is gradually modified and, after some time, the electro-chemical characteristics thereof are detrimentally affected.

The object of this invention is to provide a particularly simple and efficient remedy to this situation. According to the invention, there is arranged in direct contact with the negative substance, such as powdered zinc or zinc oxide, a fibrous and/or porous material adapted to serve as a support for an active substance, and more particularly for the negative substance. Specifically, according to the invention, cellulosic paper and preferably paper of the type known as filter-paper is used. A negative electrode according to the invention will therefore comprise the active substance proper, in finely divided condition, which may specifically comprise zinc and/or zinc oxide, wrapped, or otherwise contained in a fibrous and/or porous material in direct contact therewith.

The thickness of the fibrous and/or porous material in direct contact with the divided active substance, zinc and/or zinc oxide, is preferably selected large enough to prevent the negative substance from passing through said material.

However, an upper limit is imposed on the thickness of the material by the consideration that the accumulator should not be too large in bulk and should not possess an excessive internal resistance.

The negative electrode may further include a semi-permeable material surrounding both the active substance proper and the porous and/or fibrous packing, said surrounding material acting as a separator, and usually comprising regenerated cellulose sheet e. g. of the kind known as "cellophane."

In some cases, however, as where the fibrous and/or porous material is thick enough to prevent the active substance from oozing through it, the semi-permeable outer cover or envelope may be omitted, in which case only the positive electrode or electrodes, e. g. silver, would be provided with a cellophane or similar wrapping.

Experience has shown that a silver-zinc accumulator comprising negative electrodes wherein filter-paper is in direct contact with and envelopes the body of zinc and/or zinc oxide or hydroxide compound has a considerably longer service life, all other factors remaining equal, than does a silver-zinc accumulator without such filter-paper wrapping element.

To use fibrous materials such as cellulosic paper, and particularly blotting paper, in an accumulator has already been suggested. However, the essential importance of providing a direct contact between the fibrous material and the negative active substance has not been recognized heretofore. In the known accumulators of the kind just mentioned, a roll of blotting paper was arranged externally of a cellophane envelope which in turn directly surrounded the negative substance. Such accumulators have a much shorter useful life than accumulators according to this invention.

As materials suitable for use according to the invention, fibrous or porous materials wherein the microscopic dividing walls are approximately regularly disposed in the various directions, such as filter-paper, artificial parchment or porous ebonite, are mentioned in the first place; good results can also be had with glass wool, cotton felt, ordinary cellulosic paper such as that known as "Aldex," and also porcelain.

It seems probable that in an accumulator according to the invention the negative substance impregnates the fibers of the material which, in manufacture, is initially arranged against said substance, such impregnation proceeding gradually during the charge and discharge cycles of the accumulator's operation, and within a short time reaching a sufficient degree to prevent gravity from exerting the detrimental effects previously described. As a result there is in this way constituted a new kind of stabilized electrochemical medium which will retain its characteristics for considerably longer time than heretofore.

A more or less regular distribution of the microscopic dividing walls in the supporting material favors such action.

Figure 2:
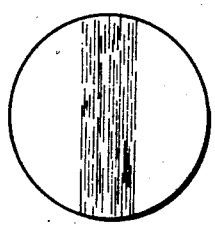
Figure 3:
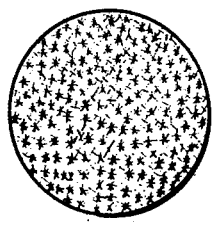
Figure 4:
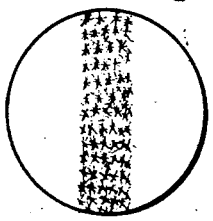
Figure 6:
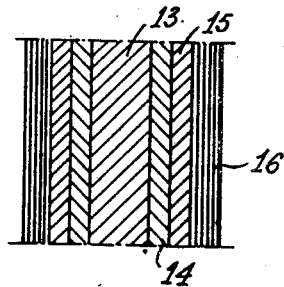
Figure 5:
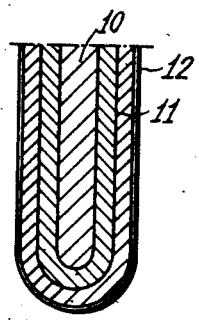
Figure 7:
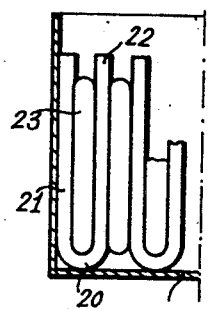

In the accompanying diagrammatic drawing:
Fig. 1 is a microscopic view of a Japanese vellum;
Fig. 2 is a microscopic view of the same edgewise;
Fig. 3 is a view similar to Fig. 1 relating to filter-paper;
Fig. 4 is a view similar to Fig. 2, but relating to filter-paper;
Fig. 5 is a diagrammatic view, in section, of a negative electrode according to the invention;
Fig. 6 is similar to Fig. 5, but for a positive electrode;
Fig. 7 is a diagrammatic view of a rechargeable battery.

Whereas the majority of paper stock, such as the Japanese vellum shown in Figs. 1 and 2, contains interlaced cellulose fibers extending in more or less parallel planes or layers, i. e. constitute a stratified formation, filter-paper has a more "homogeneous" or isotropic structure in that the fibers thereof, which are comparable in thickness to the fibers of other paper stock, are not arranged in parallel planes, but rather radiate in all directions both transversely and parallel to the sides of the sheet. Microscopic examination shows the presence of nodes formed by the fibers, which thus constitute stars the branches or rays of which are not planar but rather extend with substantial uniformity in all directions of space.

It can readily be understood that the retaining action exerted on the negative substance by a filter-paper will be greater than that of a paper sheet in which the fibers are disposed in stratified layers.

Good results have been obtained with negative electrodes in the form of a flat cake of compressed zinc oxide powder, one or two millimeters thick, surrounded by a filter-paper envelope or wrapper about one or two tenths of a millimeter thick.

It may be advantageous also to wrap the positive substance in a fibrous or porous material such as cellulose paper, e. g. blotting paper or Japanese vellum, or preferably filter-paper.

Experience has shown it to be possible in this way to obtain an accumulator which, the remaining factors remaining equal, is capable of being discharged at a more rapid rate. This can probably be accounted for by the fact that the filter-paper in contact with the active substance acts as a barrier between the latter and the cellophane or similar envelope and protects said envelope from the action of the positive substance.

In accumulators wherein the positive electrodes are not provided with filter-paper or the like, it has been found that the cellophane envelope surrounding the silver is gradually attacked by the positive substance, probably at the time the latter is in the form of a peroxide. It has accordingly been necessary to arrange the cellophane in a sufficient number of layers or laminations so that, in spite of this attack, efficient separation between the active substances of opposite polarity will still be maintained. The application of paper about and in contact with the positive substance will therefore make it possible to reduce the number of separating laminations of cellophane, thus improving the operation of the accumulator generally, and especially its capacity for rapid discharge.

Fig. 5 illustrates in section a negative electrode according to the invention for one embodiment; this negative electrode comprises negative substance in divided form, for example initially zinc oxide, the powder 10 being contained in an envelope or wrapping 11 of filter-paper in one or more laminations. If desired this envelope or wrapper may in turn be contained in an outer envelope or wrapper 12 consisting of a cellophane sheet. A negative electrode according to the invention accordingly consists of a filter-paper wrapper (with, if desired, an outer cellophane wrapper) containing within it the negative substance.

In Fig. 6 a positive electrode is shown in transverse cross section. This electrode comprises positive substance 13, which is a silver-base divided substance, and is contained in a wrapper or envelope which, in the embodiment shown, consists of one or two laminations 14 and 15 of filter-paper. These laminations are in turn wrapped in a number of cellophane sheet elements 16.

In Fig. 7 an accumulator according to the invention is diagrammatically shown. The accumulator comprises a number of negative electrodes 20 each constructed as hereinabove disclosed, and bent in the form of a U, so as to have two branches 21, 22. Between the branches of the U, a positive electrode is inserted constructed in the manner described above. The electrode assembly is contained in a container 25 and is impregnated with an alkaline electrolyte, such as an aqueous solution of potassium hydroxide, adapted to exert a swelling or dilating action, and thus providing a pressure medium wherein the electro-chemical actions can proceed.

I claim:

1. A silver-zinc electric accumulator comprising a container, a positive silver electrode in said container and a negative electrode in said container comprising filter-paper and a zinc negative substance retained in the interstices of said paper, a regenerated cellulose separator means interposed between said positive and said negative electrode, and an alkali electrolyte permeating said electrodes and said separator means, the respective dimensions of said electrodes and of said separator means on the one hand and of said container on the other hand being such that said positive electrode and said negative substance will be applied under pressure against said regenerated-cellulose separator means.

2. A silver-zinc electric battery comprising a container, a positive silver electrode in said container and a negative electrode in said container comprising filter-paper and a zinc negative substance retained in the interstices of said paper, semi-permeable separator means interposed between said positive and said negative electrode, and an alkali electrolyte permeating said electrodes and said separator means, the respective dimensions of said electrodes and of said separator means on the one hand and of said container on the other hand being such that said positive electrode and said negative substance will be applied under pressure against said separator means.

HENRI GEORGES ANDRÉ.

References Cited in the file of this patent

UNITED STATES PATENTS

| Number | Name | Date |
|---|---|---|
| 309,939 | Faure | Dec. 30, 1884 |
| 1,955,115 | Drumm | Apr. 17, 1934 |
| 2,317,711 | Andre | Apr. 27, 1943 |
| 2,561,943 | Moulton et al. | July 24, 1951 |
| 2,601,133 | Yardeny | June 17, 1952 |

FOREIGN PATENTS

| Number | Country | Date |
|---|---|---|
| 19,712 | Australia | Apr. 26, 1929 |